(12) United States Patent
Park et al.

(10) Patent No.: US 11,315,733 B2
(45) Date of Patent: Apr. 26, 2022

(54) MULTILAYER CERAMIC ELECTRONIC PARTS WITH CONDUCTIVE RESIN

(71) Applicant: SAMSUNG ELECTRO-MECHANICS CO., LTD., Suwon-si (KR)

(72) Inventors: Hye Hun Park, Suwon-si (KR); Won Kuen Oh, Suwon-si (KR); Tae Gyeom Lee, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/005,775

(22) Filed: Aug. 28, 2020

(65) Prior Publication Data

US 2021/0090804 A1 Mar. 25, 2021

(30) Foreign Application Priority Data

Sep. 20, 2019 (KR) ........................ 10-2019-0115900

(51) Int. Cl.
*H01G 4/232* (2006.01)
*H01G 4/30* (2006.01)

(52) U.S. Cl.
CPC ............. *H01G 4/2325* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 8,988,850 B1* | 3/2015 | Kodama | ............... | H01G 4/30 361/301.4 |
| 9,520,234 B2* | 12/2016 | Kang | ............... | H01G 4/30 |
| 10,658,116 B2* | 5/2020 | Kim | ............... | H01G 4/2325 |
| 2013/0155573 A1* | 6/2013 | Kim | ............... | H01G 4/0085 361/305 |
| 2014/0043724 A1* | 2/2014 | Kang | ............... | H01G 4/2325 361/321.2 |
| 2014/0192453 A1* | 7/2014 | Hong | ............... | H01G 4/12 361/301.4 |
| 2015/0068794 A1 | 3/2015 | Kang et al. | | |
| 2015/0092316 A1* | 4/2015 | Chun | ............... | H01G 4/30 361/301.4 |

(Continued)

FOREIGN PATENT DOCUMENTS

| CN | 104752054 A | * | 7/2015 | ............. H01G 2/065 |
|---|---|---|---|---|
| CN | 106298239 A | * | 1/2017 | ............... H01G 4/30 |

(Continued)

*Primary Examiner* — Timothy J. Dole
*Assistant Examiner* — Muhammed Azam
(74) *Attorney, Agent, or Firm* — Morgan, Lewis & Bockius LLP

(57) ABSTRACT

A multilayer ceramic electronic component includes a ceramic body having a dielectric layer and an internal electrode, an electrode layer connected to the internal electrode, and a conductive resin layer disposed on the electrode layer and including a conductive metal, a metal having a lower melting point than the conductive metal, a conductive carbon, and a base resin. The conductive carbon is included in the conductive resin layer in an amount of 0.5 to 5.0 parts by weight based on 100 parts by weight of the conductive metal.

24 Claims, 6 Drawing Sheets

(56) References Cited

U.S. PATENT DOCUMENTS

| | | | |
|---|---|---|---|
| 2015/0187500 A1 | 7/2015 | Kang et al. | |
| 2015/0279563 A1* | 10/2015 | Otani | H01G 4/008 |
| | | | 361/301.4 |
| 2015/0279566 A1* | 10/2015 | Otani | H01G 4/012 |
| | | | 361/301.4 |
| 2017/0301468 A1* | 10/2017 | Kim | H01G 4/232 |
| 2019/0272955 A1* | 9/2019 | Oh | H01B 1/24 |
| 2020/0152387 A1* | 5/2020 | Takeuchi | H01G 4/2325 |
| 2020/0211784 A1* | 7/2020 | Tamatani | H01G 9/045 |
| 2021/0065984 A1* | 3/2021 | Oh | H01G 4/012 |

FOREIGN PATENT DOCUMENTS

| | | | | |
|---|---|---|---|---|
| CN | 108962599 A | * | 12/2018 | ............... H01G 4/30 |
| CN | 112542323 A | * | 3/2021 | ............ H01G 4/232 |
| DE | 102004045009 A1 | * | 4/2006 | ............... H01G 4/30 |
| EP | 3034202 A1 | * | 6/2016 | ........... B22F 1/0059 |
| JP | 2012256758 A | * | 12/2012 | ............ H01G 4/232 |
| JP | 5400801 B2 | | 11/2013 | |
| JP | 2015-128130 A | | 7/2015 | |
| JP | 6094596 B2 | | 3/2017 | |
| KR | 100644528 B1 | * | 11/2006 | |
| KR | 101477430 B1 | * | 12/2014 | ............ H01G 2/065 |
| KR | 10-2015-0030450 A | | 3/2015 | |
| KR | 20150039479 A | * | 4/2015 | .......... H01G 4/2325 |
| KR | 20150073923 A | * | 7/2015 | |
| KR | 10-2018-0031531 A | | 3/2018 | |
| KR | 20190116179 A | * | 10/2019 | ............ H01G 4/005 |
| KR | 20200018554 A | * | 2/2020 | |
| KR | 102304251 B1 | * | 9/2021 | ............... H01B 1/22 |
| WO | WO-2021049056 A1 | * | 3/2021 | ............ H01G 9/012 |

* cited by examiner

MULTILAYER CERAMIC ELECTRONIC PARTS WITH CONDUCTIVE RESIN

CROSS-REFERENCE TO RELATED APPLICATION(S)

This application claims benefit of priority to Korean Patent Application No. 10-2019-0115900 filed on Sep. 20, 2019 in the Korean Intellectual Property Office, the disclosure of which is incorporated herein by reference in its entirety.

BACKGROUND

1. Field

The present inventive concept relates to a multilayer ceramic electronic component with high bending strength and electrical conductivity.

2. Description of Related Art

A multilayer ceramic capacitor is a type of ceramic electronic component that may include a plurality of dielectric layers, internal electrodes disposed to oppose each other with the dielectric layers interposed therebetween, and external electrodes electrically connected to the internal electrodes.

The internal electrodes and the external electrodes are manufactured using paste containing a conductive metal powder, in general.

A multilayer ceramic capacitor is widely used as a component of a mobile communications device such as a computer, a personal digital assistant (PDA), and a mobile phone due to its small size, high capacity, and ease of mounting.

Meanwhile, with the recent increase in industrial interest in electronic components, multilayer ceramic capacitors also require characteristics of high reliability and high strength to be used in automotive or infotainment systems.

In a multilayer ceramic capacitor, a conductive resin layer is applied to an external electrode to withstand vibrations of a vehicle body, physical shocks, and thermal shocks such as high temperature and high humidity.

A polymer material such as epoxy is applied to the conductive resin layer to improve impact resistance, and a metal powder may be mixed with a polymer material to implement electrical characteristics.

As the metal powder, a single component such as copper (Cu), tin (Sn), nickel (Ni), silver (Ag), or the like, or a mixture are being studied, and the research into Sn, a low melting point metal powder, is being actively conducted.

In recent research, Sn powder, a low melting point metal powder, and Cu powder, a high melting point metal powder, are applied, and a heat-treatment is performed at a temperature equal to or greater than a melting point of Sn to form a Cu—Sn alloy. Thus, interfacial adhesion with an electrode layer disposed there below is improved and electrical conductivity is increased.

However, if the content of Sn is high, due to network formation between Sn, a problem may occur in which the impact resistance of a conductive resin layer may be degraded.

Therefore, even if only a small amount of Sn is included, research is required to improve the interfacial adhesion with a lower electrode layer and to increase the electrical conductivity.

SUMMARY

An aspect of the present inventive concept is to provide a multilayer ceramic electronic component with high bending strength and electrical conductivity.

According to an aspect of the present inventive concept, a multilayer ceramic electronic component includes a ceramic body having a dielectric layer and an internal electrode, an electrode layer connected to the internal electrode, and a conductive resin layer disposed on the electrode layer and including a conductive metal, a metal having a lower melting point than the conductive metal, a conductive carbon, and a base resin. The conductive carbon is included in the conductive resin layer in an amount of 0.5 to 5.0 parts by weight based on 100 parts by weight of the conductive metal.

According to another aspect of the present inventive concept, a multilayer ceramic electronic component includes a ceramic body having a dielectric layer and an internal electrode, an electrode layer connected to the internal electrode, and a conductive resin layer disposed on the electrode layer and including a conductive metal, a metal having a lower melting point than the conductive metal, a conductive carbon, and a base resin. The conductive resin layer has a composition having two peaks in Raman analysis thereof.

According to another aspect of the present inventive concept, a multilayer ceramic electronic component includes a ceramic body having first internal electrodes and second internal electrodes that are alternately stacked with dielectric layers disposed therebetween, and first and second external electrodes disposed an external surface of the ceramic body and respectively connected to the first and second internal electrodes. Each of the first and second external electrodes includes a conductive resin layer including a conductive metal, a metal having a lower melting point than the conductive metal, a conductive carbon, and a base resin, and the content of the conductive carbon in the conductive resin layer is 0.4 wt % to 5.0 wt %.

According to another aspect of the present inventive concept, a multilayer ceramic electronic component includes a ceramic body having a dielectric layer and an internal electrode, an electrode layer connected to the internal electrode, and a conductive resin layer disposed on the electrode layer and including tin (Sn), a conductive metal having a melting point higher than tin (Sn), a base resin, and graphene or carbon black. The tin (Sn) is included in the conductive resin layer in an amount of 10 to 50 parts by weight based on 100 parts by weight of the conductive metal in the conductive resin layer.

BRIEF DESCRIPTION OF DRAWINGS

The above and other aspects, features and other advantages of the present disclosure will be more clearly understood from the following detailed description, taken in conjunction with the accompanying drawings, in which.

DETAILED DESCRIPTION

Figure 1:
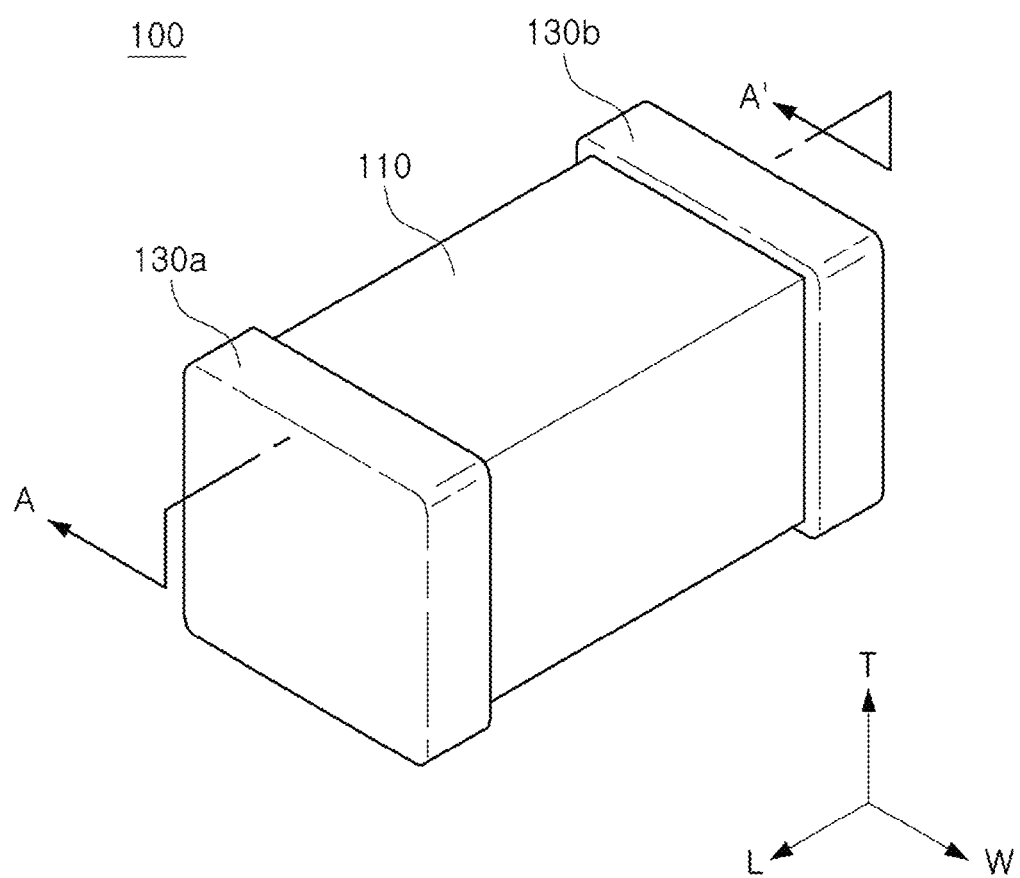
FIG. 1 is a perspective view illustrating a multilayer ceramic capacitor according to an embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region, or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers, and/or sections, these members, components, regions, layers, and/or sections should not be limited by these terms. These terms are only used to distinguish one member, component, region, layer, or section from another member, component, region, layer, or section. Thus, a first member, component, region, layer, or section discussed below could be termed a second member, component, region, layer, or section without departing from the teachings of the exemplary embodiments.

Spatially relative terms, such as "above," "upper," "below," and "lower" and the like, may be used herein for ease of description to describe one element's positional relationship relative to another element(s) in the orientation shown in the figures. It will be understood that the spatially relative terms are intended to encompass different orientations of the device and figures in use or operation in addition to the orientation depicted in the figures. As such, if the device in the figures is turned over, elements described as "above" or "upper" relative to other elements would then be oriented "below" or "lower" relative to the other elements or features. Thus, the term "above" can encompass both the above and below orientations depending on a particular direction of the device or figures. The device and figures may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views shown in the drawings and illustrating embodiments of the present disclosure. In manufactured devices, for example due to manufacturing techniques and/or tolerances, modifications of the shapes of devices may expected relative to the shapes shown in the drawings. Thus, embodiments of the present disclosure should not be construed as being limited to the particular shapes of regions shown herein, but may more generally be understood to include changes in shape resulting from manufacturing process or tolerances. The following embodiments may also be constituted by one or a combination thereof.

The contents of the present disclosure described below may have a variety of configurations and only illustrative configurations are shown and described herein, but the disclosure is not limited thereto.

Preferred embodiments of the present disclosure will hereinafter be described with reference to the attached drawings.

FIG. 1 is a perspective view illustrating a multilayer ceramic capacitor according to an embodiment of the present disclosure.

Figure 2:
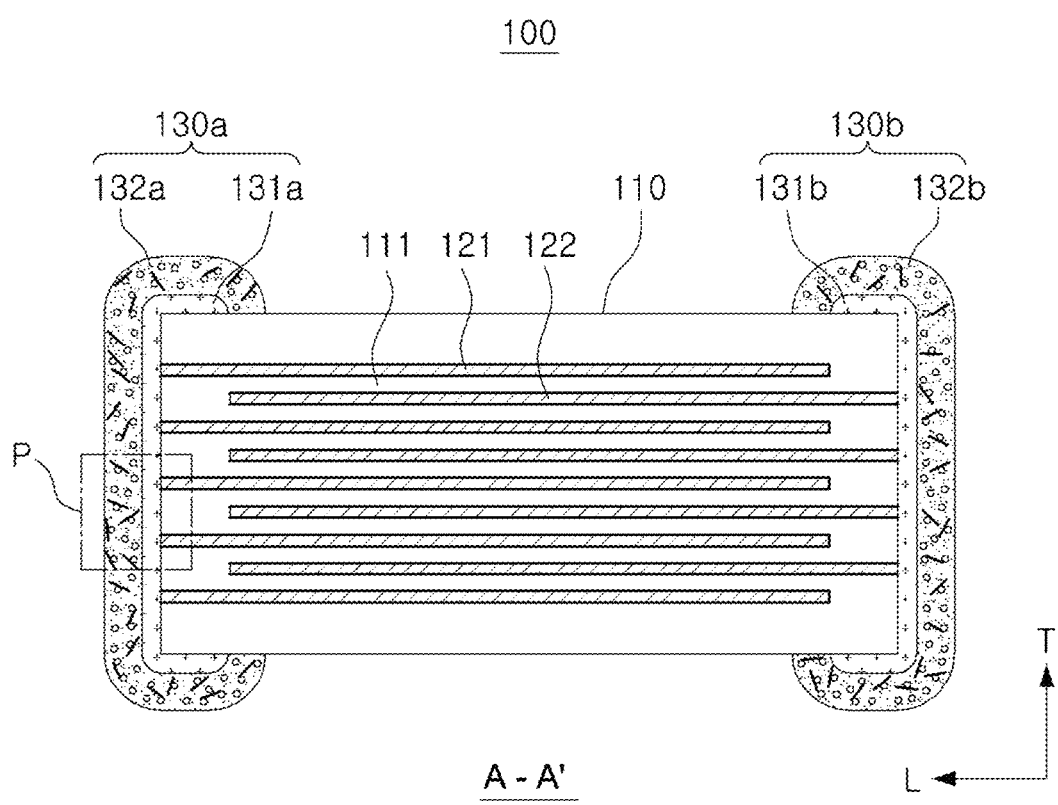
FIG. 2 is a cross-sectional view taken along line A-A' of FIG. 1.

FIG. 2 is a cross-sectional view taken along line A-A' of FIG. 1.

Figure 3:
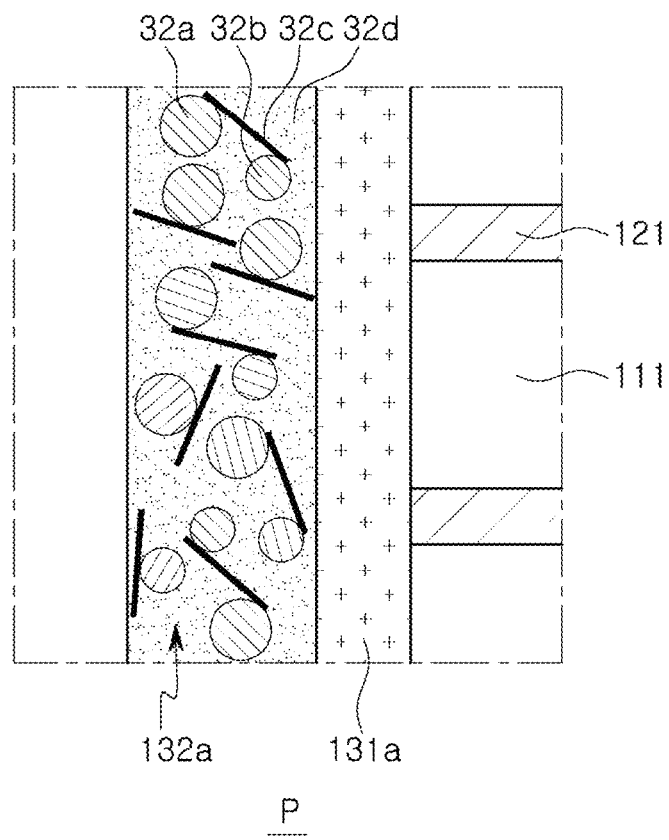
FIG. 3 is an enlarged view of region P of FIG. 2.

FIG. 3 is an enlarged view of region P of FIG. 2.

Referring to FIGS. 1 to 3, a multilayer ceramic electronic component 100 according to an embodiment of the present disclosure includes a ceramic body 110 including dielectric layers 111 and internal electrodes 121 and 122, electrode layers 131a and 131b connected to the internal electrodes 121 and 122, and conductive resin layers 132a and 132b formed on the electrode layers 131a and 131b and including a conductive metal 32a, a metal 32b having a lower melting point than the conductive metal 32a, a conductive carbon 32c, and a base resin 32d.

In detail, the multilayer ceramic electronic component includes the ceramic body 110 including the dielectric layers 111, first and second internal electrodes 121 and 122 alternately stacked to face each other with the dielectric layers 111 interposed therebetween in the ceramic body 110, a first electrode layer 131a electrically connected to the first internal electrode(s) 121, a second electrode layer 131b electrically connected to the second internal electrode(s) 122, a first conductive resin layer 132a formed on the first electrode layer 131a, and a second conductive resin layer 132b formed on the second electrode layer 131b, while the first conductive resin layer 132a and the second conductive resin layer 132b each include a conductive metal 32a, a metal 32b having a lower melting point than the conductive metal 32a, a conductive carbon 32c, and a base resin 32d.

The first and second conductive resin layers 132a and 132b are formed by applying external electrode paste including a conductive metal 32a, a metal 32b having a lower melting point than the conductive metal 32a, a conductive carbon 32c, and a base resin 32d, while the conductive carbon 32c is included in an amount of 0.5 to 5.0 parts by weight based on 100 parts by weight of the conductive metal 32a.

The metal 32b having a lower melting point than the conductive metal 32a may be tin (Sn), and the tin (Sn) may be included in an amount of 10 to 50 parts by weight based on 100 parts by weight of the conductive metal 32a.

Moreover, the conductive carbon 32c may be at least one of graphene, carbon nanotubes, and carbon black. In particular, the conductive carbon 32c may be graphene.

The metal 32b having a lower melting point than the conductive metal 32a and the conductive carbon 32c will be described later.

The base resin 32d is not particularly limited as long as the bonding properties and shock absorption are provided, and the base resin is mixed with powder of the conductive metal 32a to make paste, and may include, for example, an epoxy resin.

The base resin 32d may be included in an amount of 5 to 30 parts by weight based on 100 parts by weight of the conductive metal.

If the content of the base resin 32d is less than 5 parts by weight, it may be difficult to perform a paste manufacturing operation due to lack of resin, phase stability is lowered to cause phase separation or viscosity change on standing, dispersibility of metals is lowered to reduce a filling rate, and thus a decrease in density may be caused. If the content of the base resin 32d exceeds parts by weight, due to the excessive resin content, the intermetallic contact is lowered to increase specific resistance, and an area of a resin in a surface portion is increased. Thus, when the first and second conductive resin layers 132a and 132b are formed to form a plating layer, the unplating problem may occur.

According to the related art, in a multilayer ceramic capacitor for an electrical device, a conductive resin layer is applied to an external electrode to withstand vibrations of a vehicle body, physical shocks, and thermal shocks such as high temperature and high humidity.

In general, when a conductive resin layer is disposed in an external electrode of a multilayer ceramic capacitor, a conductive resin layer is manufactured to cover the entirety of an electrode layer electrically connected to an internal electrode, so a current flows through a conductive resin layer for electrical conduction with the outside.

The conductive resin layer may be formed by including a conductive metal for securing electrical conductivity and a base resin for shock absorption. When the conductive resin layer includes a base resin, durability against external stimuli, such as warpage of a multilayer ceramic electronic component may be improved.

A polymer material such as an epoxy is applied to the conductive resin layer to improve impact resistance, and metal powder is mixed with a polymer material to implement electrical conductivity characteristics.

As a metal powder, a single component such as Cu, Sn, Ni, Ag, or the like, or a mixture thereof are being studied, and the research on Sn, a low melting point metal powder, is being actively conducted.

In the recent research, Sn powder, which is a metal powder having a low melting point, and Cu powder, which is a metal powder having a high melting point (e.g., higher than the melting point of Sn powder), are applied, and a heat-treatment is performed at a temperature equal to or greater than a melting point of Sn to form a Cu—Sn alloy. Thus, interfacial adhesion with an electrode layer disposed below is improved and electrical conductivity is increased.

However, if the content of Sn is high, due to network formation between Sn, a problem in which the impact resistance of a conductive resin layer may be degraded.

However, according to an embodiment of the present disclosure, the first and second conductive resin layers 132a and 132b each include a conductive metal 32a, a metal 32b having a lower melting point than the conductive metal 32a, a conductive carbon 32c, and a base resin 32d, and the conductive carbon 32c is included in an amount of 0.5 to 5.0 parts by weight based on 100 parts by weight of the conductive metal 32a. Thus, even when only a small amount of Sn is included, bending strength could be improved, and a multilayer ceramic electronic component having high electrical conductivity could be implemented.

That is, the metal 32b having a lower melting point than the conductive metal 32a may be tin (Sn), and the tin (Sn) may be included in an amount of 10 to 50 parts by weight based on 100 parts by weight of the conductive metal 32a.

Moreover, the conductive carbon 32c may be at least one of graphene, carbon nanotubes, and carbon black. In particular, the conductive carbon 32c may be graphene.

In detail, the first and second conductive resin layers 132a and 132b include 0.5 to 5.0 parts by weight of the conductive carbon 32c based on 100 parts by weight of the conductive metal 32a, so the bending strength of the multilayer ceramic capacitor according to an embodiment of the present disclosure is improved, and the electrical conductivity is also increased.

If the content of the conductive carbon 32c is less than 0.5 parts by weight, a multilayer ceramic electronic component with low equivalent series resistance could not be implemented, and, due to network formation between Sn, impact resistance may be degraded.

Meanwhile, if the content of the conductive carbon 32c exceeds 5.0 parts by weight, during formation of a plating layer in an upper portion of the first and second conductive resin layers 132a and 132b, the unplating defect or fixing strength degradation may occur.

When the content of the conductive carbon 32c is represented by the content included in paste of an external electrode, the content of the conductive carbon 32c corresponds to the content of about 0.4 wt % to 5.0 wt %. In this case, if the content of the conductive carbon 32c is less than 0.4 wt %, a multilayer ceramic electronic component with low equivalent series resistance as described above could not be implemented, and impact resistance degradation may occur.

Meanwhile, if the content of the conductive carbon 32c exceeds 5.0 wt %, during formation of a plating layer in an upper portion of the first and second conductive resin layers 132a and 132b, the unplating defect or fixing strength degradation may occur.

In detail, if the content of the conductive carbon 32c exceeds 5.0 wt %, due to a resin shortage phenomenon inside the first and second conductive resin layers 132a and 132b, a viscosity ratio becomes high. Thus, when paste for formation of a conductive resin layer is applied to an exterior of a body, a corner portion of the body becomes thin, so moisture resistance characteristics are degraded, and a problem of reduced reliability may thus occur.

Tin (Sn), a metal 32b having a lower melting point than the conductive metal 32a, is included in an amount of 10 to 50 parts by weight based on 100 parts by weight of the conductive metal 32a, and thus interfacial adhesion between the electrode layers 131a and 131b and the conductive resin layers 132a and 132b is improved, so bending strength could be improved.

If the tin (Sn), the metal 32b having a lower melting point than the conductive metal 32a, is included in an amount less than 10 parts by weight based on 100 parts by weight of the conductive metal 32a, interfacial adhesion between an electrode layer and a conductive resin layer is lowered, so a problem related to bending strength may occur.

Meanwhile, if the tin (Sn), the metal 32b having a lower melting point than the conductive metal 32a, is included in an amount greater than 50 parts by weight based on 100 parts by weight of the conductive metal 32a, due to network formation between Sn, impact resistance degradation may occur.

Referring to FIG. 3, in the conductive resin layers 132a and 132b, the conductive carbon 32c may be provided in the form dispersed in the base resin 32d, and may be adsorbed on a surface of the conductive metal 32a.

Moreover, the conductive carbon 32c may connect the conductive metal 32a to the tin (Sn), the metal 32b having a lower melting point than the conductive metal 32a.

As the conductive carbon 32c connects the conductive metal 32a to the tin (Sn), the metal 32b having a lower melting point than the conductive metal 32a, while interfacial adhesion between the electrode layers 131a and 131b and the conductive resin layers 132a and 132b is improved due to a small amount of tin (Sn), high electrical conductivity is also ensured due to the conductive carbon 32c.

Moreover, the conductive carbon 32c is provided in the form dispersed in the base resin 32d, and thus an increase in equivalent series resistance (ESR) of a multilayer ceramic electronic component due to the base resin 32d may be offset.

In detail, the conductive carbon 32c with excellent electrical conductivity and low specific resistance is dispersed in the base resin 32d for decreasing equivalent series resistance (ESR), and thus the equivalent series resistance (ESR) of the multilayer ceramic electronic component may be lowered.

Meanwhile, the conductive carbon 32c may be graphene. When the conductive carbon 32c is graphene, in the conductive resin layers 132a and 132b, the graphene may be dispersed in a plate shape.

Since the graphene is dispersed in a plate shape inside the first and second conductive resin layers 132a and 132b, a specific surface area is large, so an effect of reduction of equivalent series resistance (ESR) of a multilayer ceramic electronic component may be more excellent.

According to the related art, in order to solve a problem in which the equivalent series resistance (ESR) of a multilayer ceramic electronic component is increased due to a conductive resin layer included in an external electrode, attempts have been made to include carbon nanotubes (CNT) in a conductive resin layer.

The carbon nanotubes (CNT) are manufactured to include at least one between a single-wall carbon nanotube and a multi-wall carbon nanotube.

However, the carbon nanotubes (CNT) have a filled or empty column shape, or a pipe shape having a passage therein. In this regard, if the carbon nanotubes (CNT) are not included in an amount equal to or greater than a certain amount, the effect of a reduction of equivalent series resistance (ESR) of a multilayer ceramic electronic component is not significant.

Moreover, to allow intermetallic contact and tunneling in a conductive resin layer, the dispersion in paste of an external electrode is required.

On the other hand, if the content of carbon nanotubes (CNT) is excessive in order to increase an effect of reduction of equivalent series resistance (ESR) of a multilayer ceramic electronic component, a problem related to dispersion of carbon nanotubes (CNT) in paste of an external electrode may occur.

Moreover, if the content of the carbon nanotubes (CNT) is excessive, during formation of a plating layer in an upper portion of a conductive resin layer, a problem of the unplating defect or fixing strength degradation may occur.

In addition, if the content of the carbon nanotubes (CNT) is excessive, the content of a base resin contained in a conductive resin layer is relatively small, and thus an impact mitigation effect due to the elasticity of the conductive resin layer cannot be obtained.

However, according to an embodiment of the present disclosure, as a conductive carbon 32c in the first and second conductive resin layers 132a and 132b, graphene 32c having a plate shape of which specific surface area is large is included, so an effect of reduction of equivalent series resistance (ESR) of a multilayer ceramic electronic component may be more excellent.

That is, since the graphene 32c according to an embodiment of the present disclosure has a plate shape and a specific surface area thereof is large, as compared with carbon nanotubes, only a small amount of graphene could be used to obtain an excellent effect of reduction of equivalent series resistance (ESR) of a multilayer ceramic electronic component.

Moreover, since a small amount of the graphene 32c has higher electrically-conductive characteristics as compared with carbon nanotubes, the graphene could be uniformly dispersed during manufacturing of paste of an external electrode, so reliability may be excellent.

Moreover, the first and second conductive resin layers 132a and 132b include a content of graphene 32c in a certain range as a conductive carbon, and thus, during formation of a plating layer above, a problem of the unplating defect or fixing strength degradation may not occur.

In addition, even when the first and second conductive resin layers 132a and 132b include a small amount of graphene 32c, an effect of reduction of equivalent series resistance (ESR) of a multilayer ceramic electronic component could be obtained, so the content of a base resin could be included in a manner similar to the related art. Thus, an impact mitigation effect due to the elasticity of the conductive resin layer could be obtained in a manner similar to the related art.

Moreover, as described above, the first and second conductive resin layers 132a and 132b include a conductive metal 32a and tin (Sn), and the metal 32b having a lower melting point than the conductive metal 32a, and the conductive carbon 32c connects the conductive metal 32a and tin (Sn) 32b, so bending strength of a multilayer ceramic capacitor could be improved and high electrical conductivity could be implemented.

As the conductive carbon, a length of a long axis of the graphene 32c is 0.2 nm to 10 μm, and a length of short axis thereof is 0.2 nm to 10 μm, but it is not necessarily limited thereto.

According to an embodiment of the present disclosure, the graphene 32c may be provided as at least one piece of graphene disposed in an area of 1 μm×1 μm (width×height) in the first and second conductive resin layers 132a and 132b. For example, the amount of graphene 32c may be provided in the first and second conductive resin layers 132a and 132b in a sufficient concentration such that at least one piece of graphene is disposed in an area of 1 μm×1 μm (width×height) in a cross-section of the first and second conductive resin layers 132a and 132b.

Measurement of the graphene 32c is not particularly limited, and, for example, the graphene may be measured in an area of 1 μm×1 μm (width×height) in the first and second conductive resin layers 132a and 132b.

For example, regarding measurement of the graphene 32c in an area of 1 μm×1 μm (width×height) in the first and second conductive resin layers 132a and 132b, an image of a cross-section in a length-thickness direction of a multilayer ceramic capacitor is scanned using a transmission electron microscope (TEM) to perform measurement.

In detail, the graphene 32c is measured in an area of 1 μm×1 μm (width×height) for acquisition of a region of the first and second conductive resin layers 132a and 132b extracted from an image, in which a cross-section in a length-thickness (L-T) direction, cut in the center in a width (W) direction of a multilayer ceramic capacitor, is scanned using a transmission electron microscope (TEM).

Figure 4:
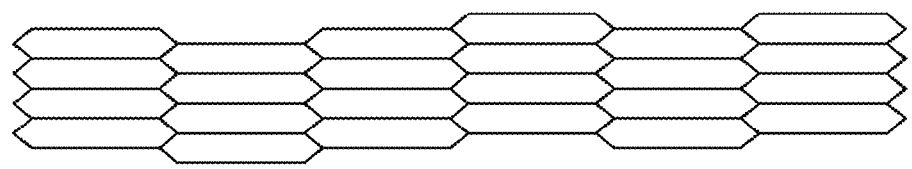
FIG. 4 is a schematic enlarged view illustrating graphene, as used in one configuration of the present disclosure.

FIG. 4 is a schematic enlarged view illustrating graphene, as may be used in one configuration of the present disclosure.

Referring to FIG. 4, the graphene 32c may have a form in which a plurality of plate-shaped structures are stacked.

Since a specific surface area of each plate-shaped structure is large, with only a small amount of the graphene 32c having a form in which a plurality of plate-shaped structures are stacked, an effect of reduction of equivalent series resistance (ESR) of a multilayer ceramic electronic component may be excellent.

That is, the graphene 32c with low specific resistance and excellent electrical conductivity has a plate-shaped structure in which a specific surface area is large, and respective plate-shaped structures are stacked as a plurality of plate-shaped structures, and thus, with only a small amount of graphene, an effect of reduction of equivalent series resistance (ESR) of a multilayer ceramic electronic component may be excellent.

In addition, even when the first and second conductive resin layers 132a and 132b include a small amount of graphene 32c, an effect of reduction of equivalent series resistance (ESR) of a multilayer ceramic electronic component could be obtained, so the content of a base resin could be included in a manner similar to the related art. Thus, an impact mitigation effect due to the elasticity of the conductive resin layer could be obtained in a manner similar to the related art.

Moreover, the first and second conductive resin layers 132a and 132b include a conductive metal 32a and a metal 32b such as tin (Sn) having a lower melting point than the conductive metal 32a, and the conductive carbon 32c connects the conductive metal 32a and tin (Sn) 32b, so bending strength of a multilayer ceramic capacitor could be improved and high electrical conductivity could be implemented.

The conductive metal 32a may be one or more selected from the group consisting of copper (Cu), nickel (Ni), silver (Ag), and silver-palladium (Ag—Pd), but it is not limited thereto.

A raw material of the dielectric layer 111 is not particularly limited as long as sufficient capacitance may be obtained. For example, the raw material of the dielectric layer 111 may be barium titanate ($BaTiO_3$) powder particles. Moreover, a material of the dielectric layer 111 may be prepared by adding various ceramic additives, organic solvents, plasticizers, binders, dispersing agents, and the like, to powder particles such as barium titanate ($BaTiO_3$) powder particles, or the like, according to an object of the present disclosure.

Here, a material, forming the first and second internal electrodes 121 and 122, is not particularly limited. For example, the first and second internal electrodes 121 and 122 may include at least one among silver (Ag), lead (Pb), platinum (Pt), nickel (Ni), and copper (Cu).

The first and second electrode layers 131a and 131b are directly connected to the first and second internal electrodes 121 and 122, respectively, to ensure electrical conduction between the first and second external electrodes 130a and 130b and the first and second internal electrodes 121 and 122, respectively.

The first and second electrode layers 131a and 131b may include a conductive metal, and the conductive metal may be nickel (Ni), copper (Cu), palladium (Pd), gold (Au), or alloys thereof, but an embodiment of the present disclosure is not limited thereto.

The first and second electrode layers 131a and 131b may be a sintered electrode formed by sintering paste including a conductive metal.

Figure 7:
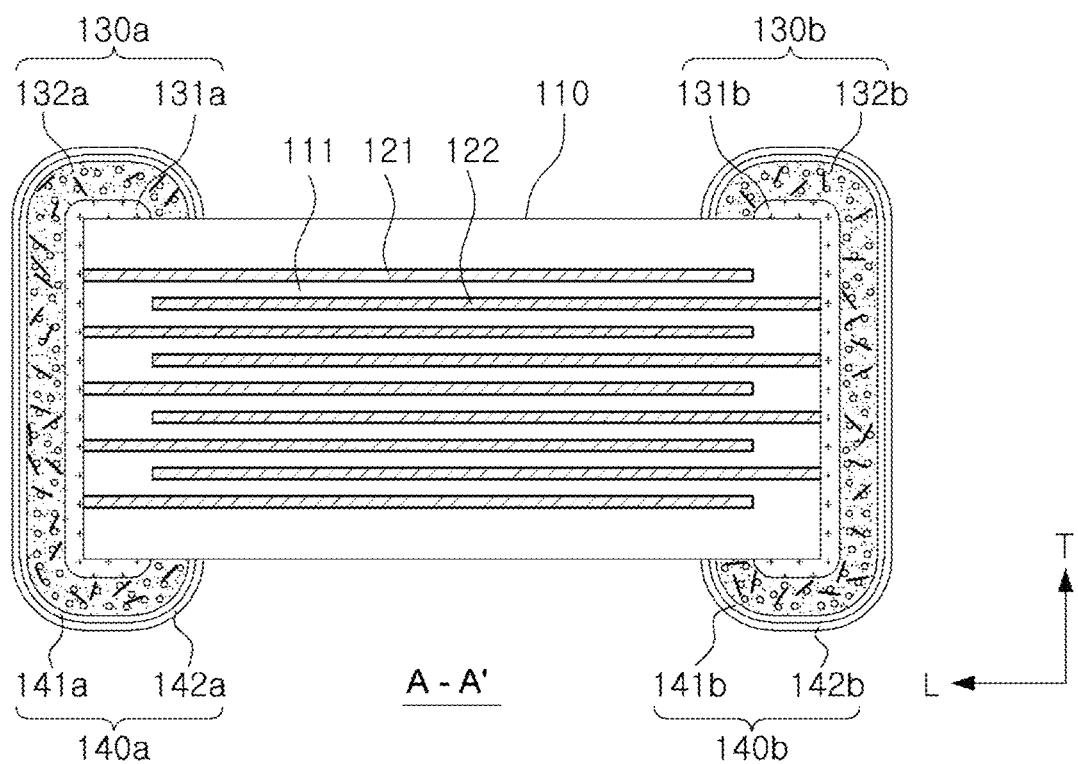
FIG. 7 is a cross-sectional view according to an additional embodiment.

As described in the embodiment of FIG. 7, plating layers 140a and 140b may be formed on the first and second conductive resin layers 132a and 132b, respectively. The plating layer 140a may include a nickel plating layer 141a and a tin plating layer 142a. Likewise, the plating layer 140b may include a nickel plating layer 141b and a tin plating layer 142b. The nickel plating layers 141a and 141b are disposed on the first and second conductive resin layers 132a and 132b, respectively, while the tin plating layers 142a and 142b may be disposed on the nickel plating layers 141a and 141b, respectively.

Table 1 below shows the results of initial equivalent series resistance (ESR) measurements and a crack incidence rate measurement during evaluation of bending strength, while changing the content of the conductive carbon 32c, based on the content of a conductive metal 32a and a metal 32b having a lower melting point than the conductive metal 32a, included in the first and second conductive resin layers 132a and 132b of a multilayer ceramic capacitor.

The conductive metal 32a was copper (Cu), the metal 32b having a lower melting point than the conductive metal 32a was tin (Sn), and the conductive carbon 32c was graphene.

In Table 1, when a content ratio of copper (Cu):tin (Sn) is 9:1, the case in which graphene is included in an amount of 0 wt % corresponds to Comparative Example 1, because a conductive carbon is not included. Moreover, in this case, Example 1 is a case in which the graphene 32c is included in an amount of 0.1 wt %, Example 2 is a case in which the graphene 32c is included in an amount of 1.0 wt %, and Example 3 is the case in which the graphene 32c is included in an amount of 5.0 wt %.

Next, the case in which a content ratio of copper (Cu):tin (Sn) is 5:5, as the case in which the content of a metal having a lower melting point than a conductive metal based on 100 parts by weight of the conductive metal is 100 parts by weight, corresponds to Comparative Examples 2 to 5.

In the cases of Comparative Examples 2 to 5, graphene is included in the amounts of 0 wt %, 0.1 wt %, 1.0 wt %, and 5.0 wt %, respectively.

A multilayer ceramic capacitor according to each of Comparative Example and Example was manufactured to have a 3216 size (length×width is 3.2 mm×1.6 mm), and Table 1 below shows the results of a crack incidence during evaluation of initial equivalent series resistance (ESR) and bending strength of a multilayer ceramic capacitor.

TABLE 1

| addition amount of graphene | | 0 wt % | 0.1 wt % | 1.0 wt % | 5.0 wt % |
|---|---|---|---|---|---|
| content ratio (9:1) of copper(Cu):tin(Sn) | equivalent series resistance (ESR) (mΩ) | 20 | 17 | 8 | 5 |
| | crack incidence (%) during evaluation of bending strength | 0 | 0 | 0 | 0 |
| content ratio (5:5) of copper(Cu):tin(Sn) | equivalent series resistance (ESR) (mΩ) | 5 | 5 | 5 | 5 |
| | crack incidence (%) during evaluation of bending strength | 80 | 80 | 80 | 80 |

Referring to Table 1, as the case in which a content ratio of copper (Cu):tin (Sn) is 9:1, in Comparative Example 1 in which graphene is included in an amount of 0 wt %, a value of equivalent series resistance (ESR) of a multilayer ceramic capacitor is high, which may be a problem.

Next, in the case, Comparative Examples 2 to 5, in which a content ratio of copper (Cu):tin (Sn) is 5:5, the content of tin (Sn) is significant, and thus, due to network formation between tin (Sn), it can be seen that a crack incidence is high during evaluation of bending strength.

On the other hand, as the case in which a content ratio of copper (Cu):tin (Sn) is 9:1, in Examples 1 to 3, in which graphene is included in the amounts of 0.1 wt %, 1.0 wt %, and 5.0 wt %, respectively, while a value of equivalent series resistance (ESR) of a multilayer ceramic capacitor was low, cracking did not occur during evaluation of bending strength, so it can be seen that reliability is excellent.

A multilayer ceramic electronic component according to an embodiment of the present disclosure may be manufactured as follows.

First, slurry formed including powder such as barium titanate ($BaTiO_3$) is applied on a carrier film and dried to prepare a plurality of ceramic green sheets, and thus a dielectric layer 111 can be prepared.

Regarding a ceramic green sheet, a ceramic powder, a binder, and a solvent are mixed to prepare slurry, and the slurry is manufactured as a sheet having a thickness of several μm using a doctor blade method.

Next, conductive paste for an internal electrode including nickel powder is prepared.

The conductive paste for an internal electrode is applied on the green sheet using a screen printing method to form an internal electrode, and then a plurality of green sheets on each of which the internal electrode is printed are stacked, and a plurality of green sheets, on which an internal electrode is not printed, are stacked on upper and lower surfaces of a stack structure and then sintered to manufacture a ceramic body 110. The ceramic body includes first and second internal electrodes 121 and 122, dielectric layers 111, and upper and lower cover layers, where the dielectric layer is formed by sintering green sheets on which internal electrodes are printed, and the cover layers are formed by sintering green sheets on which an internal electrode is not printed.

The internal electrodes may be formed as first and second internal electrodes.

First and second electrode layers 131a and 131b may be formed on outer surfaces of a ceramic body 110 to be electrically connected to the first and second internal electrodes 121 and 122, respectively. The first and second electrode layers 131a and 131b may be formed by sintering paste including a conductive metal and glass.

The conductive metal is not particularly limited, but may be one or more selected from the group consisting of copper (Cu), silver (Ag), nickel (Ni), and alloys thereof, and it is preferable to include copper (Cu) as described above.

The glass is not particularly limited, but may be a material having a composition the same as glass used to manufacture an external electrode of a multilayer ceramic capacitor according to the related art.

A conductive resin composition including copper is applied to an exterior of the first and second electrode layers 131a and 131b to form first and second conductive resin layers 132a and 132b. The conductive resin composition may include powder of a conductive metal 32a including copper, tin (Sn) (i.e., a metal 32b having a lower melting point than the conductive metal 32a), and a base resin 32d, and the base resin may be an epoxy resin, a thermosetting resin.

According to an embodiment of the present disclosure, the first and second conductive resin layers 132a and 132b further include a conductive carbon 32c of 0.5 to 5.0 parts by weight based on 100 parts by weight of the conductive metal 32a.

The first and second conductive resin layers 132a and 132b include 0.5 to 5.0 parts by weight of the conductive carbon 32c based on 100 parts by weight of the conductive metal 32a, so equivalent series resistance of a multilayer ceramic capacitor according to an embodiment of the present disclosure may be reduced.

Moreover, the first and second conductive resin layers 132a and 132b include 0.5 to 5.0 parts by weight of the conductive carbon 32c based on 100 parts by weight of the conductive metal 32a, so the bending strength of the multilayer ceramic capacitor according to an embodiment of the present disclosure is improved, and the electrical conductivity is also increased.

In addition, the first and second conductive resin layers 132a and 132b may include 10 to 50 parts by weight of tin (Sn) (i.e., the metal 32b having a lower melting point than the conductive metal 32a), based on 100 parts by weight of the conductive metal 32a.

Tin (Sn), a metal 32b having a lower melting point than the conductive metal 32a, is included in an amount of 10 to 50 parts by weight based on 100 parts by weight of the conductive metal 32a, and thus interfacial adhesion between the electrode layers 131a and 131b and the conductive resin layers 132a and 132b is improved, so bending strength could be improved.

After formation of the first and second conductive resin layers 132a and 132b, further forming of a nickel plating layer and a tin plating layer thereon may be included.

Figure 5:
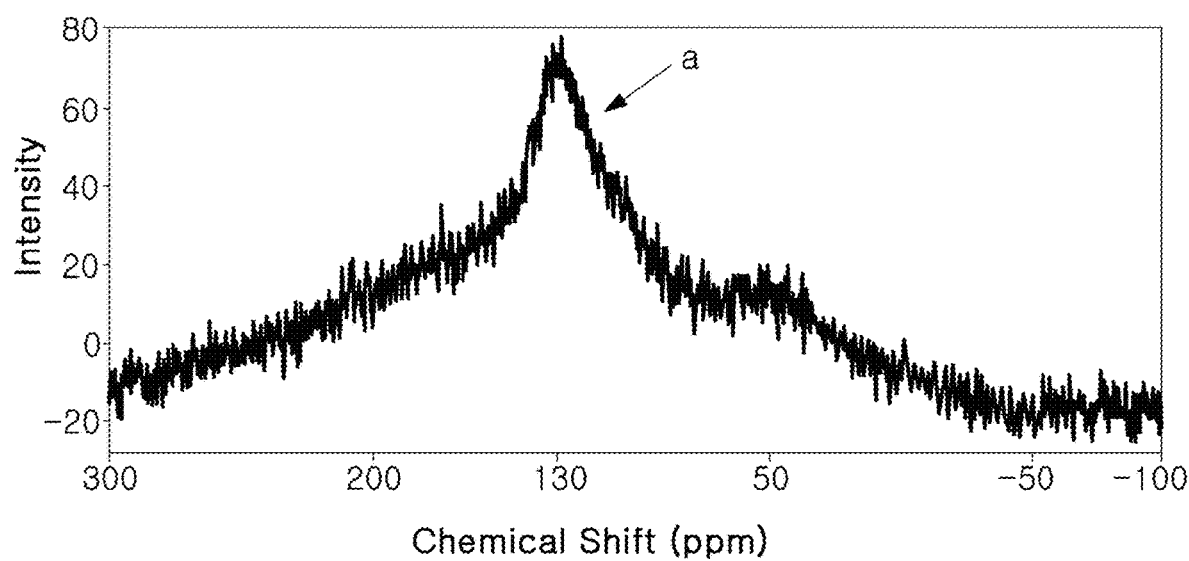
FIG. 5 is a graph illustrating a nuclear magnetic resonance (NMR) analysis result of external electrode paste including graphene according to an embodiment of the present disclosure.

FIG. 5 is a graph illustrating a nuclear magnetic resonance (NMR) analysis result of external electrode paste including graphene according to an embodiment of the present disclosure.

Referring to FIG. 5, when nuclear magnetic resonance (NMR) analysis is performed on paste of an external electrode including graphene according to an embodiment of the present disclosure, it can be seen that a peak due to an $sp^2$ carbon is detected.

The peak a due to the $sp^2$ carbon could be detected in the same manner when analysis is performed on an external electrode of a multilayer ceramic capacitor to which paste of an external electrode including graphene according to an embodiment of the present disclosure is applied.

Figure 6:
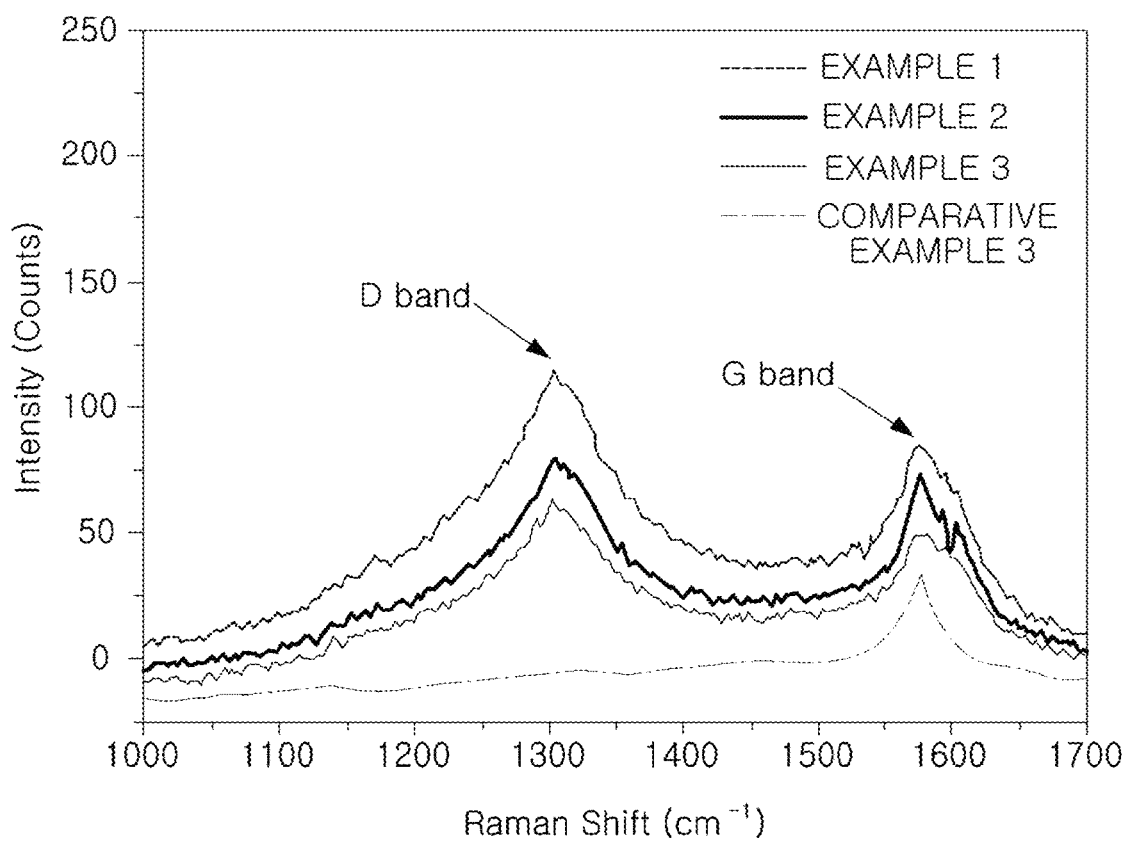
FIG. 6 is a graph illustrating a Raman analysis result with respect to a conductive resin layer including graphene according to an embodiment of the present disclosure.

FIG. 6 is a graph illustrating a Raman analysis result with respect to a conductive resin layer including graphene according to an embodiment of the present disclosure.

Referring to FIG. 6, a multilayer ceramic electronic component 100 according to another embodiment of the present disclosure includes a ceramic body 110 including a dielectric layer 111 and internal electrodes 121 and 122, electrode layers 131a and 131b respectively connected to the internal electrodes 121 and 122, and conductive resin layers 132a and 132b respectively formed on the electrode layers 131a and 131b and including a conductive metal, a metal having a lower melting point than the conductive metal, a conductive carbon, and a base resin, and two peaks are detected, in the Raman analysis of the conductive resin layers 132a and 132b.

As illustrated in a Raman analysis graph of FIG. 6, in the case of Examples 1 to 3, as a sample of an embodiment of the present disclosure, two peaks are detected. In the case of Comparative Example 1, as a Raman analysis graph of graphite, only one peak is detected.

In another embodiment of the present disclosure, the two peaks are detected in a D band and a G band.

Moreover, in the case of Comparative Example 1, the only one peak that is detected is in a G band.

In another embodiment of the present disclosure, the conductive resin layers 132a and 132b include graphene as a conductive carbon.

In the Raman analysis of the conductive resin layers 132a and 132b, two peaks are detected because the conductive resin layers 132a and 132b include graphene, and a Raman analysis graph may be different with another carbon material.

As set forth above, according to example embodiments of the present inventive concept, a conductive resin layer of an external electrode includes a conductive metal, a metal having a lower melting point than the conductive metal, a conductive carbon, and a base resin, and the contents of the metal having a lower melting point than the conductive metal and the conductive carbon are adjusted, so bending strength may be improved, and a multilayer ceramic electronic component having high electrical conductivity may be implemented.

While example embodiments have been shown and described above, it will be apparent to those skilled in the art that modifications and variations could be made without departing from the scope of the present disclosure, as defined by the appended claims.

What is claimed is:

1. A multilayer ceramic electronic component, comprising:
    a ceramic body including a dielectric layer and an internal electrode;
    an electrode layer connected to the internal electrode; and
    a conductive resin layer disposed on the electrode layer, and including a conductive metal, a metal having a lower melting point than the conductive metal, a conductive carbon, and a base resin,
    wherein the conductive carbon is included in the conductive resin layer in an amount of 0.5 to 5.0 parts by weight based on 100 parts by weight of the conductive metal.

2. The multilayer ceramic electronic component of claim 1, wherein the metal having the lower melting point than the conductive metal is tin (Sn).

3. The multilayer ceramic electronic component of claim 2, wherein the tin (Sn) is included in the conductive resin layer in an amount of 10 to 50 parts by weight based on 100 parts by weight of the conductive metal.

4. The multilayer ceramic electronic component of claim 1, wherein the conductive carbon is at least one of graphene, carbon nanotubes, and carbon black.

5. The multilayer ceramic electronic component of claim 4, wherein the conductive carbon is graphene, and a length of a long axis of the graphene of the conductive carbon is 0.2 nm to 10 µm.

6. The multilayer ceramic electronic component of claim 4, wherein the conductive carbon is graphene, and a length of a short axis of the graphene of the conductive carbon is 0.2 nm to 10 µm.

7. The multilayer ceramic electronic component of claim 1, wherein the conductive carbon is provided as at least one conductive carbon disposed in an area of 1 µm×1 µm (width×height) in a cross-section of the conductive resin layer.

8. A multilayer ceramic electronic component, comprising:
    a ceramic body including a dielectric layer and an internal electrode;
    an electrode layer connected to the internal electrode; and
    a conductive resin layer disposed on the electrode layer, and including a conductive metal, a metal having a lower melting point than the conductive metal, a conductive carbon, and a base resin,
    wherein the conductive resin layer has a composition having two peaks in Raman analysis thereof.

9. The multilayer ceramic electronic component of claim 8, wherein the composition of the conductive resin layer has the two peaks including a peak in a D band and a peak in a G band.

10. The multilayer ceramic electronic component of claim 8, wherein the conductive carbon is graphene.

11. The multilayer ceramic electronic component of claim 10, wherein the graphene is included in the conductive resin layer in an amount of 0.5 to 5.0 parts by weight based on 100 parts by weight of the conductive metal.

12. The multilayer ceramic electronic component of claim 10, wherein a length of a long axis of the graphene is 0.2 nm to 10 µm.

13. The multilayer ceramic electronic component of claim 10, wherein a length of a short axis of the graphene is 0.2 nm to 10 µm.

14. The multilayer ceramic electronic component of claim 8, wherein the metal having the lower melting point than the conductive metal is tin (Sn).

15. The multilayer ceramic electronic component of claim 14, wherein the tin (Sn) is included in the conductive resin layer in an amount of 10 to 50 parts by weight based on 100 parts by weight of the conductive metal in the conductive resin layer.

16. A multilayer ceramic electronic component, comprising:
    a ceramic body including first internal electrodes and second internal electrodes that are alternately stacked with dielectric layers disposed therebetween; and
    first and second external electrodes disposed an external surface of the ceramic body and respectively connected to the first and second internal electrodes,
    wherein each of the first and second external electrodes includes a conductive resin layer including a conductive metal, a metal having a lower melting point than the conductive metal, a conductive carbon, and a base resin, and content of the conductive carbon in the conductive resin layer is 0.4 wt % to 5.0 wt %.

17. The multilayer ceramic electronic component of claim 16, wherein the conductive carbon is at least one of graphene and carbon black.

18. The multilayer ceramic electronic component of claim 16, wherein the metal having the lower melting point than the conductive metal is included in the conductive resin layer in an amount of 10 to 50 parts by weight based on 100 parts by weight of the conductive metal in the conductive resin layer.

19. The multilayer ceramic electronic component of claim 16, wherein the first and second external electrodes are disposed on respective opposing surface of the ceramic body, and each include an electrode layer disposed between the conductive resin layer and the respective opposing surface of the ceramic body.

20. The multilayer ceramic electronic component of claim 16, wherein the conductive metal of the conductive resin layer of the first and second external electrodes includes at least one of copper (Cu), nickel (Ni), silver (Ag), and silver-palladium (Ag—Pd).

21. A multilayer ceramic electronic component, comprising:
a ceramic body including a dielectric layer and an internal electrode;
an electrode layer connected to the internal electrode; and
a conductive resin layer disposed on the electrode layer, and including tin (Sn), a conductive metal having a melting point higher than tin (Sn), a base resin, and graphene or carbon black,
wherein the tin (Sn) is included in the conductive resin layer in an amount of 10 to 50 parts by weight based on 100 parts by weight of the conductive metal in the conductive resin layer.

22. The multilayer ceramic electronic component of claim 21, wherein the graphene in the conductive resin layer is 0.5 to 5.0 parts by weight based on 100 parts by weight of the conductive metal.

23. The multilayer ceramic electronic component of claim 21, wherein the carbon black in the conductive resin layer is 0.5 to 5.0 parts by weight based on 100 parts by weight of the conductive metal.

24. The multilayer ceramic electronic component of claim 21, wherein a length of a long axis of the graphene in the conductive resin layer is 0.2 nm to 10 μm.

* * * * *